(12) United States Patent
Zenitani et al.

(10) Patent No.: US 9,919,930 B2
(45) Date of Patent: Mar. 20, 2018

(54) SILICA PARTICLES AND METHOD OF PREPARING THE SAME

(71) Applicant: FUJI XEROX CO., LTD., Tokyo (JP)

(72) Inventors: Yuka Zenitani, Kanagawa (JP);
Takeshi Iwanaga, Kanagawa (JP);
Yasunobu Kashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 132 days.

(21) Appl. No.: 14/921,278

(22) Filed: Oct. 23, 2015

(65) Prior Publication Data

US 2016/0039682 A1 Feb. 11, 2016

Related U.S. Application Data

(62) Division of application No. 13/741,873, filed on Jan. 15, 2013, now abandoned.

(30) Foreign Application Priority Data

Aug. 24, 2012 (JP) ................................. 2012-185694

(51) Int. Cl.
| | |
|---|---|
| *C01B 33/12* | (2006.01) |
| *C09C 1/30* | (2006.01) |
| *C01B 33/148* | (2006.01) |
| *C01B 33/145* | (2006.01) |

(52) U.S. Cl.
CPC ............ *C01B 33/12* (2013.01); *C01B 33/145* (2013.01); *C01B 33/148* (2013.01); *C09C 1/30* (2013.01); *C01P 2004/32* (2013.01); *C01P 2004/53* (2013.01); *C01P 2004/62* (2013.01); *Y10T 428/2982* (2015.01)

(58) Field of Classification Search
CPC ..... C01B 33/12; C01B 33/145; C01B 33/148; C09C 1/30
See application file for complete search history.

(56) References Cited

U.S. PATENT DOCUMENTS

| | | | |
|---|---|---|---|
| 5,230,953 A | 7/1993 | Tsugeno et al. | |
| 7,238,387 B2 | 7/2007 | Ogawa et al. | |
| 2011/0318581 A1 | 12/2011 | Zenitani et al. | |
| 2011/0318584 A1 | 12/2011 | Yoshikawa et al. | |

FOREIGN PATENT DOCUMENTS

| | | |
|---|---|---|
| CN | 102295292 A | 12/2011 |
| JP | 2008-184584 A | 8/2008 |
| JP | 2010-192904 A | 9/2010 |

OTHER PUBLICATIONS

Jan. 12, 2016 Office Action issued in Chinese Application No. 201310071237.4.

*Primary Examiner* — Melvin C Mayes
*Assistant Examiner* — Michael Forrest
(74) *Attorney, Agent, or Firm* — Oliff PLC

(57) ABSTRACT

Provided are methods of preparing silica particles having two maximum values in number particle size distribution, wherein in the two maximum values, a particle size ratio (a maximum value of a small-size side/a maximum value of a large-size side) between a maximum value of a large-size side and a maximum value of a small-size side is from 0.02 to 0.3, and a number ratio (a number of silica particles having a maximum value of the small-size side/number of silica particles having a maximum value of the large-size side) is from 1 to 100, and particles within a range of 10% from the large-size side of the silica particles have an average circularity of from 0.65 to 0.90 and an average shrinkage ratio of from 10 to 50.

16 Claims, No Drawings

SILICA PARTICLES AND METHOD OF PREPARING THE SAME

CROSS-REFERENCE TO RELATED APPLICATIONS

This application is Divisional of Application No. 13/741,873 filed Jan. 15, 2013, now abandoned, which claims the benefit of and is based on (and claims priority under 35 usc 119 from) Japanese Patent Application No. 2012-185694 filed Aug. 24, 2012. The disclosures of the prior applications are hereby incorporated by reference herein in theft entireties.

BACKGROUND

1. Technical Field

The present invention relates to silica particles and a method of preparing the same.

2. Related Art

As an attempt at improving properties of materials, two or more same kinds of inorganic particles differing in size, shape, or the like are mixed together.

SUMMARY

According to an aspect of the invention, there is provided silica particles having two maximum values in number particle size distribution, wherein in the two maximum values, a particle size ratio (a maximum value of a small-size side/a maximum value of a large-size side) is from 0.02 to 0.3, a number ratio (number of silica particles having a maximum value of the small-size side/number of silica particles having a maximum value of the large-size side) is from 1 to 100, and particles within a range of 10% from the large-size side of the silica particles have an average circularity of from 0.65 to 0.90 and an average shrinkage ratio of from 10 to 50.

DETAILED DESCRIPTION

Hereinafter, exemplary embodiments as an example of the present invention will be described.

Silica Particles

The silica particles according to the present exemplary embodiment are silica particles having two maximum values in number particle size distribution, wherein in the two maximum values, a particle size ratio (a maximum value of a small-size side/a maximum value of a large-size side) between a maximum value of a large-size side and a maximum value of a small-size side is from 0.02 to 0.3, a number ratio (a number of silica particles having a maximum value of the small-size side/number of silica particles having a maximum value of large-size side) is from 1 to 100, and particles within a range of 10% from the large-size side of the silica particles have an average circularity of from 0.65 to 0.90 and an average shrinkage ratio of from 10 to 50.

The silica particles according to the present exemplary embodiment improve the fluidity of a substance to which the particles are to be attached.

Though unclear, the reason is considered to be as below.

The silica particles having two maximum values (large-size side and small-size side) in the number particle size distribution are silica particles having two different types of particle sizes and numbers of particles. The silica particles having the above particle size ratio and number ratio are considered to be particles in which the particle size of the particles of the large-size side is larger than that of the particles of the small-size side by 10/3 times to 50 times, and the number of the particles of the small-size side is larger than that of the particles of the large-size side by 1 time to 100 times.

It is considered that, among such silica particles, when the particles of the large-size side are attached to a substance to which the particles are to be attached, this makes the particles of the small-size side be easily attached onto the surface of the substance exposed between the attached particles of the large-size side, whereby a coverage ratio of the substance is improved. It is considered that since the particles of the large-size side function as a spacer, and exposure of the substance to which the particles are to be attached is inhibited by the particles of the small-size side, substances to which the particles are to be attached are inhibited from adhering to each other.

In addition, the silica particles within a range 10% from the large-size side of the silica particles have many concavities and convexities and an irregular shape overall as silica particles compared to spherical silica particles, the degree of surface smoothness of these silica particles is low compared to spherical silica particles, and the surface area thereof is large. Accordingly, it is considered that in a state where such silica particles having these characteristics are attached to a substance to which the particles are to be attached, the particles are inhibited from moving (showing uneven distribution) to or being embedded in concavities of the substance, whereby the state where the silica particles are attached to the substance is maintained. It is also considered that loss of the silica particles resulting from stress concentration caused when a mechanical load is applied to the silica particles is inhibited.

For the above reasons, the silica particles according to the present exemplary embodiment are considered to improve the fluidity of a substance to which the particles are to be attached.

Hereinafter, the silica particles of the present exemplary embodiment will be described.

—Particle Size Ratio—

In the silica particles according to the present exemplary embodiment, among the two maximum values in number particle size distribution, a particle size ratio (a maximum value of a small-size side/a maximum value of a large-size side) between a maximum value of large-size side and a maximum value of a small-size side is from 0.02 to 0.3, preferably from 0.03 to 0.2, and even more preferably from 0.04 to 0.1.

If the particle size ratio of the silica particles is less than 0.02, this makes it difficult for the silica particles to cover a substance to which the particles are to be attached, and substances to which the particles are to be attached easily adhere to each other. Consequently, it is difficult for the silica particles to improve the fluidity of the substance.

On the other hand, if the particle size ratio of the silica particles exceeds 0.3, this makes it difficult for the silica particles to cover a substance to which the particles are to be attached, and substances to which the particles are to be attached easily adhere to each other. Consequently, it is difficult for the silica particles to improve the fluidity of the substance.

The particle size in the maximum value of the large-size side of the silica particles is preferably from 50 nm to 500 nm, more preferably from 80 nm to 400 nm, and even more preferably from 100 nm to 300 nm. The particle size in the maximum value of the small-size side is preferably from 2 nm to 100 nm, more preferably from 5 nm to 80 nm, and even more preferably from 10 nm to 50 nm.

The particle size ratio of the silica particles is defined by the ratio of the particle size of the maximum value of the small-size side to the particle size in the maximum value of the large-size side in the number particle size distribution of the silica particles. In addition, the particle size ratio of the silica particles is calculated as follows. First, in a body of resin particles (for example, polyester resin, a weight average molecular weight Mw=50000) having a volume average particle diameter of 100 μm, specific silica particles are dispersed, and then the particles are observed using a Scanning Electron Microscope. The obtained image of the particles is analyzed, thereby obtaining a number particle size distribution of the silica particles. Subsequently, based on the distribution pattern, the size of particles in the large-size side and the size of particles in the small-size side are obtained respectively from the maximum value of the large-size side and the maximum value of small-size side. Finally, from the size of particles of the small-size side and the size of particles of the large-size side, the particle size ratio of the silica particles is calculated.

—Number Ratio—

In the silica particles according to the present exemplary embodiment, among the two maximum values in the number particle size distribution, a number ratio (a number of silica particles having a maximum value of the small-size side/a number of silica particles having a maximum value of the large-size side) between the maximum value of the large-size side and the maximum value of the small-size side is from 1 to 100, preferably from 10 to 80, and more preferably from 30 to 60.

If the number ratio of the silica particles is less than 1, this makes it difficult for the silica particles to cover a substance to which the particles are to be attached, and substances to which the particles are to be attached easily adhere to each other. Consequently, it is difficult for the silica particles to improve the fluidity of the substance.

On the other hand, if the number ratio of the silica particles exceeds 100, the number of particles of the large-size side becomes extremely small compared to the number of particles of the small-size side. This makes it difficult for the particles of large-size side to function as a spacer, and substances to which the particles are to be attached easily adhere to each other. Consequently, it is difficult for the silica particles to improve the fluidity of the substance.

The number ratio of the silica particles is defined by the ratio of the number of the particle sizes in the maximum value of the small-size side to the number of the particle sizes in the maximum value of the large-size side in the number particle size distribution obtained by the particle size ratio of the silica particles. In addition, the number ratio of the silica particles is obtained as follows. First, specific silica particles are dispersed in a body of resin particles (for example, a polyester resin, weight average molecular weight Mw=50000) having a volume average particle diameter of 100 μm, and then the particles are observed using a Scanning Electron Microscope. The obtained image of the particles is analyzed, thereby obtaining a number distribution of the particle sizes. Subsequently, the number of particles of which the particle size is within maximum particle size±10% (within a range of from −10% to +10%) of the large-size side and the number of particles of which the particle size is within maximum particle size±10% (within a range of from −10% to +10%) of the small-size side are calculated. Finally, from the obtained number of particles of the large-size side and the number of particles of the small-size side, the number ratio of the silica particles is calculated.

—Average Circularity—

The average circularity of primary particles within a range of 10% from the large-size side of the silica particles of the present exemplary embodiment is from 0.65 to 0.90, preferably from 0.70 to 0.85, and even more preferably from 0.75 to 0.80.

If the average circularity of the silica particles is less than 0.65, the silica particles have a shape of a sphere in which a ratio of length/width is large. Therefore, when a mechanical load is applied to the silica particles, stress concentration is caused, so the loss of particles is easily caused. Moreover, a substance to which the particles are to be attached does not easily maintain fluidity. Further, when the silica particles according to the present exemplary embodiment are prepared by a sol-gel method, it is difficult to prepare silica particles having an average circularity of primary particles of less than 0.65.

On the other hand, if the average circularity of the silica particles exceeds 0.90, the shape of the silica particles becomes close to a sphere. Accordingly, when the silica particles are attached to a substance to which the particles are to be attached, the particles show uneven distribution and become embedded in concavities, and this makes it difficult to improve the fluidity of the substance.

In addition, in order to obtain the circularity of the silica particles, primary particles obtained after the silica particles are dispersed in resin particles (polyester, a weight average molecular weight Mw=50000) having a particle size of 100 μm are observed by a Scanning Electron Microscope. From the result of the analysis performed on the obtained image of the primary particles, the circularity is obtained as "100/SF2" calculated from the following formula.

$$\text{Circularity}(100/SF2) = 4\pi \times (A/I^2)$$

In the above formula, I represents a perimeter of the primary particles in the image, and A represents a projected area of the primary particles.

Moreover, the average circularity of the primary particles of the silica particles is obtained as a 50% circularity in cumulative frequency of circle-equivalent diameters of 100 primary particles obtained by the above image analysis.

—Average Shrinkage Ratio—

An average shrinkage ratio of the primary particles within a range of 10% from the large-size side of the silica particles of the present exemplary embodiment is from 10 to 50, preferably from 20 to 45, and more preferably from 30 to 40.

If the average shrinkage ratio of the silica particles is less than 10, the surface of the silica particles becomes smooth, and the amount of silanol groups on the surface of the silica particles becomes smaller than the amount of silanol groups of the silica particles of which the surface is not smooth, whereby the amount of water held in the surface becomes small. Moreover, the state where the silica particles are attached to a substance to which the particles are to be attached is not easily maintained. Consequently, it is difficult for the silica particles to improve the fluidity of the substance.

On the other hand, if the average shrinkage ratio of the silica particles exceeds 50, this makes it difficult to prepare the silica particles according to the present exemplary embodiment by a sol-gel method. In addition, attaching the silica particles to the substance to which the particles are to be attached becomes difficult. Consequently, it is difficult for the silica particles to improve the fluidity of the substance.

In order to obtain the shrinkage ratio of the silica particles, the silica particles are dispersed in resin particles (polyester, a weight average molecular weight Mw=50000) having a volume average particle diameter of 100 μm, and then primary particles of the silica particles are observed by a Scanning Electron Microscope. From the result of analysis performed on the obtained planar image of the primary particles, the shrinkage ratio is calculated by the following formula.

Shrinkage ratio=(1−$H/I$)×100

In the above formula, H represents an envelope perimeter of the silica particles in the image, and I represents a perimeter of the silica particles in the image. The envelope perimeter refers to a perimeter that is obtained when the apexes of convexities of the silica particles in the planar image are connected to each other with a shortest distance. The perimeter refers to a length of the outline itself of the silica particles in the planar image. The shrinkage ratio is an index indicating to what degree the particle has shrunk compared to a convex hull. The greater the shrinkage ratio, the rougher the surface and the larger the surface area.

In addition, the average shrinkage ratio of the silica particles is calculated as an average of the shrinkage ratio of each of 100 silica particles that is calculated by the above formula.

In order to determine the average circularity and average shrinkage ratio of the particles within a range of 10% from the large-size side of the silica particles, based on the number particle size distribution measured by image analysis, a cumulative distribution is drawn from the large-size side for divided particle size ranges (channels), the particle sizes of which the number is within a range of cumulative 10% from the large-size side is measured, and the average circularity and average shrinkage ratio of the particles within a range of cumulative 10% are measured.

—Number Average Particle Diameter—

The number average particle diameter of whole silica particles is, for example, preferably from 100 nm to 200 nm, more preferably from 105 nm to 180 nm, and even more preferably from 110 nm to 160 nm.

In order to define a number average particle diameter $D_{50p}$, based on the measured particle size distribution, a cumulative distribution is drawn from the small-size side in terms of the number of particles for divided particle size ranges (channels), and the particle size which is cumulative 50% in terms of the number is defined as $D_{50p}$. Specifically, the number average particle diameter $D_{50p}$ is obtained as follows. By using a number distribution obtained by image analysis, a cumulative distribution is drawn, and a particle size $D_{50p}$ which is cumulative 50% in terms of the number is obtained.

Method of Preparing Silica Particles

The method of preparing silica particles according to the present exemplary embodiment is a preparation method for obtaining the silica particles according to the above exemplary embodiment. Specifically, the method is as follows.

The method of preparing silica particles according to the present exemplary embodiment is a method including a step of preparing an alkaline catalyst solution in which an alcohol-containing solvent contains an alkaline catalyst at a concentration of 0.6 mol/L to 1.0 mol/L (hereinafter, called "a step of preparing an alkaline catalyst solution" in some cases), and a step of supplying tetraalkoxysilane and alkaline catalyst into the alkaline catalyst solution (hereinafter, called "a supplying step" in some cases), wherein provided that a total amount of the tetraalkoxysilane supplied is A, a flow rate of the tetraalkoxysilane supplied/a total amount of a solution formed when the tetraalkoxysilane and the alkaline catalyst are supplied into the alkaline catalyst solution is B, and a concentration of water in a reaction system is C, at any point in time when the amount of the tetraalkoxysilane supplied falls within a range of from A/2 to A, a state where C/B is from 15 (mol/L)/{(mol/min)/L} to 60 (mol/L)/{(mol/min)/L} is created.

That is, the method of preparing silica particles according to the present exemplary embodiment is a method in which while each of the tetraalkoxysilane as a raw material and the alkaline catalyst as a catalyst is being separately supplied in the above relationship in the presence of alcohol containing the alkaline catalyst at the above concentration, the tetraalkoxysilane is reacted to generate the silica particles by a sol-gel method.

In the method of preparing silica particles according to the present exemplary embodiment, by the above technique, the silica particles which have two maximum values (large-size side and small-size side) in number particle size distribution and of which the particles of the large-size side have an irregular shape are easily obtained. Specifically, for example, it is easy to obtain silica particles having two maximum values in number particle size distribution, wherein among the two maximum values, a particle size ratio (a maximum value of a small-size side/a maximum value of a large-size side) between the maximum value of a large-size side and the maximum value of the small-size side is from 0.02 to 0.3, a number ratio (a number of silica particles having a maximum value of the small-size side/a number of silica particles having a maximum value of the large-size side) is from 1 to 100, and the particles within a range of 10% from the large-size side of the silica particles have an average circularity of from 0.65 to 0.90 and an average shrinkage ratio of from 10 to 50. Though unclear, the reason is considered to be as below.

In the method of preparing silica particles according to the present exemplary embodiment, the supplying step is divided into two stages. The two stages include a stage where the amount of the tetraalkoxysilane supplied is 0 or more and less than A/2, and a stage where the amount is from A/2 to A.

First, the stage where the amount of the tetraalkoxysilane supplied is 0 or more and less than A/2 will be described.

In the alcohol-containing solvent, when the tetraalkoxysilane and an alkaline catalyst are supplied respectively into the alkaline catalyst solution containing an alkaline catalyst, the tetraalkoxysilane supplied into the alkaline catalyst solution reacts, whereby core particles are formed. It is considered that, at this time, if the concentration of the alkaline catalyst in the alkaline catalyst solution falls within the above range, core particles having an irregular shape are generated while the generation of coarse aggregates such as secondary aggregates is being inhibited. The reason is considered to be as follows. The alkaline catalyst not only has a catalytic action, but also contributes to the shape and dispersion stability of the core particles by being coordinated to the surface of the generated core particles. However, if the amount of the alkaline catalyst is within the above range, the alkaline catalyst does not evenly cover the surface of the core particles (that is, the alkaline catalyst shows uneven distribution and becomes attached to the surface of the core particles). Accordingly, though the dispersion stability of the core particles is maintained, the surface tension and chemical affinity of the core particles are unevenness in some parts, so core particles having an irregular shape are generated.

In addition, if the supply of the tetraalkoxysilane and the supply of the alkaline catalyst are continued respectively, the generated core particles grow due to the reaction of the tetraalkoxysilane, whereby the silica particles are obtained. It is considered that, at this time, if the tetraalkoxysilane and the alkaline catalyst are supplied while their amounts supplied is being maintained in the above relationship, the generation of coarse aggregates such as secondary aggregates is inhibited, and at the same time, the core particles having an irregular shape grow while retaining the irregular shape. The reason is considered to be as below. If the amount of the tetraalkoxysilane and alkaline catalyst supplied is set in the above relationship, while the dispersed state of the core particles is being maintained, the partial concentration of the surface tension and the chemical affinity on the surface of the core particles is maintained. Accordingly, growth of the core particles while maintaining the irregular shape is caused.

Next, the stage where the amount of the tetraalkoxysilane supplied is from A/2 to A will be described.

At the stage where the particles of the large-size side that have an irregular shape have grown, in a state where C/B is from 15 (mol/L)/{(mol/min)/L} to 60 (mol/L)/{(mol/min)/L}, that is, in a state where the concentration of water in the solution in which the silica particles are generated is set to be low compared to a case of generating spherical silica particles, and the amount of the tetraalkoxysilane supplied into the alkaline catalyst solution is set to be large compared to the initial stage of the supplying step, the tetraalkoxysilane and the alkaline catalyst are supplied. If the tetraalkoxysilane and the alkaline catalyst are supplied in this state, since the amount of water is small in this state, a hydrolysis reaction is caused slowly. Consequently, it is considered that the concentration of unreacted monomers (tetraalkoxysilane) increases, so a probability that the monomers may collide with each other increases. Therefore, it is considered that new core particles to be an origin of the particles of the small-size side are formed easily. In addition, it is considered that at any point in time at the stage where the amount is from A/2 to A, if the tetraalkoxysilane and the alkaline catalyst are supplied in the above state, new core particles to be an origin of the particles of the small-size side are formed easily.

That is, it is considered that, in the present exemplary embodiment, by generating the core in two stages, and by generating the core of the particles of the large-size side before generating the core of the particles of the small-size side, two types of silica particles (particles of large-size side and particles of small-size side) differing in the particle size are generated.

As described above, in the method of preparing silica particles according to the present exemplary embodiment, by the above technique, it is easy to obtain silica particles which have two maximum values (large-size side and the small-size side) in number particle size distribution and in which the particles of the large-size side have an irregular shape.

In addition, it is considered that, in the method of preparing silica particles according to the present exemplary embodiment, the generated core particles having an irregular shape grow while maintaining the irregular shape, and the silica particles are obtained in this manner, whereby the silica particles which are resistant to a mechanical load and not easily broken are obtained.

Further, in the method of preparing silica particles according to the present exemplary embodiment, the tetraalkoxysilane and the alkaline catalyst are respectively supplied into the alkaline catalyst solution, and the tetraalkoxysilane is reacted to generate particles. Accordingly, compared to the case of preparing silica particles having an irregular shape by a sol-gel method of the related art, the total amount of the alkaline catalyst used is reduced, and consequently, a step of removing the alkaline catalyst may be omitted. It is considered that this is particularly advantageous for the case where the silica particles are applied to products requiring a high purity.

Hereinafter, the respective step will be described.

First, the step of preparing an alkaline catalyst solution will be described.

In the step of preparing an alkaline catalyst solution, an alcohol-containing solvent is prepared, and an alkaline catalyst is added thereto to prepare an alkaline catalyst solution.

The alcohol-containing solvent may be, for example, a solvent consisting only of alcohol, or a mixed solvent containing another solvent like water, ketones such as acetone, methyl ethyl ketone, and methyl isobutyl ketone, cellosolves such as methyl cellosolve, ethyl cellosolve, butyl cellosolve, and cellosolve acetate, and ethers such as dioxane and tetrahydrofuran, if necessary. In the case of the mixed solvent, the amount of alcohol based on another solvent is preferably 80% by weight or more and more preferably 90% by weight or more.

In addition, examples of the alcohol include lower alcohols such as methanol and ethanol.

The alkaline catalyst refers to a catalyst for accelerating the reaction (a hydrolysis reaction and a condensation reaction) of tetraalkoxysilane, and examples thereof include basic catalysts such as ammonia, urea, monoamines, and quaternary ammonium salts. Among these, ammonia is particularly preferable.

The concentration (content) of the alkaline catalyst is preferably from 0.6 mol/L to 1.0 mol/L, more preferably from 0.63 mol/L to 0.78 mol/L, and even more preferably from 0.66 mol/L to 0.75 mol/L.

If the concentration of the alkaline catalyst is less than 0.6 mol/L, dispersibility of the core particles in the process of growth among the generated core particles becomes unstable. Accordingly, coarse aggregates such as secondary aggregates are generated, or the particles are gelated, so silica particles are not obtained.

On the other hand, if the concentration of the alkaline catalyst exceeds 1.0 mol/L, the generated core particles are stabilized too much. Accordingly, spherical core particles are generated, and core particles with an irregular shape having an average circularity of 0.90 or less are not obtained. As a result, silica particles having an irregular shape are not obtained.

In addition, the concentration of the alkaline catalyst refers to a concentration based on the alcohol catalyst solution (alkaline catalyst+alcohol-containing solvent).

Next, the supplying step will be described.

The supplying step is a step of generating silica particles by supplying the tetraalkoxysilane and the alkaline catalyst respectively into the alkaline catalyst solution and reacting (a hydrolysis reaction and a condensation reaction) the tetraalkoxysilane in the alkaline catalyst solution.

Further, this supplying step is divided into two stages including a stage where the amount of the tetraalkoxysilane supplied is 0 or more and less than A/2 and a stage where the amount is from A/2 to A. Hereinafter, the two stages in the supplying step will be described.

1) Stage where Amount of Tetraalkoxysilane Supplied is 0 or More and Less than A/2

In this stage, at the initial stage of supplying tetraalkoxysilane, core particles to be an origin of the particles of the large-size side are generated by the reaction of the tetraalkoxysilane (stage of core particle generation), and then the core particles grow (stage of core particle growth). In this stage, C/B is preferably in a state where C/B exceeds 60 (mol/L)/{(mol/min)/L}.

2) Stage where Amount of Tetraalkoxysilane Supplied is from A/2 to A

In this stage, the tetraalkoxysilane and the alkaline catalyst are continuously supplied into the alkaline catalyst solution respectively, and at any point in time when the amount of the tetraalkoxysilane supplied falls within the above range, C/B is placed in a state where C/B is from 15 (mol/L)/{(mol/min)/L} to 60 (mol/L)/{(mol/min)/L}. After core particles to be an origin of particles of the small-size side are generated (stage of core particle generation), these particles grow (stage of core particle growth). In addition, core particles to be particles of the large-size side also grow. Thereafter, silica particles are generated.

C/B is defined as a ratio of C (concentration of water) in the reaction system to B (flow rate of the tetraalkoxysilane supplied based on the total amount of the solution into which the tetraalkoxysilane and the alkaline catalyst have been supplied) in the alkaline catalyst solution in which silica particles are generated. The value of C/B is an index showing the ratio of water to the tetraalkoxysilane supplied into the reaction system by being newly supplied dropwise in a certain reaction scale.

Herein, the each value of C and B is a value at each point in time when each of the values of C/B is obtained, and the total amount of the solution is an amount of the solution, in which the supplied alkaline catalyst has been dissolved in a solvent, including the solvent. In addition, the words "in the reaction system" refers to the alkaline catalyst solution for preparing silica particles of the present exemplary embodiment.

C/B is from 15 (mol/L)/{(mol/min)/L} to 60 (mol/L)/{(mol/min)/L}, preferably from 20 (mol/L)/{(mol/min)/L} to 50 (mol/L)/{(mol/min)/L}, and more preferably from 25 (mol/L)/{(mol/min)/L} to 40 (mol/L)/{(mol/min)/L}.

When C/B is less than 15, dispersibility of the silica particles becomes unstable, so the silica slurry is gelated. On the other hand, if C/B exceeds 60, the stage of core generation is not divided into two stages. Accordingly, the obtained silica particles do not have two maximum values in number particle size distribution.

Herein, as methods of setting C/B within the above range, 1) increasing the amount of tetraalkoxysilane supplied dropwise, 2) decreasing the concentration of water during the reaction by increasing the concentration of aqueous ammonia supplied dropwise, 3) decreasing the amount of water charged initially, and the like are exemplified.

In the method of preparing silica particles according to the present exemplary embodiment, at any point in time when the amount of the tetraalkoxysilane supplied is from A/2 to A, a state where C/B is within the above range is created. The rate at which C/B is within the above range is preferably 20% or higher, preferably 50% or higher, more preferably 80% or higher, and most preferably 100%, when the amount of the tetraalkoxysilane supplied is from A/2 to A.

In addition, the rate at which the state where C/B is within the above range is calculated at any point in time when the amount of the tetraalkoxysilane supplied is from A/2 to A. For example, the points may be continuous or intermittent.

Specifically, for example, when the rate at which C/B is within the above range is 50%, examples of the points include continuous points in time of the initial stage where the amount of the tetraalkoxysilane supplied is from A/2 to A (for example, from A/2 to 3A/4), continuous points in time after this stage (for example, from 3A/4 to A), continuous points in time in the middle of the stage (for example, from 5A/8 to 7A/8 and the like), and the like.

Examples of the tetraalkoxysilane supplied into the alkaline catalyst solution include tetramethoxysilane, tetraethoxysilane, tetrapropoxysilane, tetrabutoxysilane, and the like. Among these, in view of the controllability of the reaction rate and the shape, particle size, and particle size distribution of the silica particles obtained, tetramethoxysilane (TMOS) and tetraethoxysilane are preferable.

The amount of the tetraalkoxysilane supplied is preferably 0.002 mol/(mol·min) or more and less than 0.006 mol/(mol·min), and more preferably from 0.002 mol/(mol·min) to 0.0033 mol/(mol·min), based on the mole number of the alcohol in the alkaline catalyst solution.

If the amount of the tetraalkoxysilane supplied is in the above range, the average circularity of the primary particles within a range of 10% from the large-size side of the number particle size distribution easily becomes from 0.65 to 0.90.

Moreover, if the amount of the tetraalkoxysilane supplied is less than 0.002 mol/(mol·min), the probability that the tetraalkoxysilane supplied dropwise may contact the core particles is more reduced. However, it takes a long time until the dropwise supply of the total amount of tetraalkoxysilane ends, so production efficiency deteriorates in some cases.

On the other hand, if the amount of the tetraalkoxysilane supplied is 0.006 mol/(mol·min) or more, it is considered that the reaction between tetraalkoxysilane molecules is caused before the tetraalkoxysilane supplied dropwise reacts with the core particles. Consequently, this encourages the tetraalkoxysilane to be unevenly supplied to the core particles, and the core particles formed show variation. As a result, the width of distribution of the particle size and shape is enlarged, and it is difficult to prepare silica particles of which the primary particles within a range of 10% from the large-size side of the number particle size distribution have an average circularity of from 0.65 to 0.90.

In addition, the amount of the tetraalkoxysilane supplied refers to a mole number of the tetraalkoxysilane supplied per minute, per 1 mol of alcohol in the alkaline catalyst solution.

Meanwhile, examples of the alkaline catalyst supplied into the alkaline catalyst solution include those exemplified above. The alkaline catalyst supplied may be the same types as the alkaline catalyst contained in advance in the alkaline catalyst solution or a different type of catalyst, but the catalyst is preferably the same type of catalyst.

The amount of the alkaline catalyst supplied is preferably from 0.1 mol to 0.4 mol, more preferably from 0.14 mol to 0.35 mol, and even more preferably from 0.18 mol to 0.30 mol, per 1 mol as the total amount of the tetraalkoxysilane supplied per minute.

When the amount of the alkaline catalyst supplied is less than 0.1 mol, the dispersibility of core particles in the process of growth among the generated core particles becomes unstable. Accordingly, coarse aggregates such as secondary aggregates are generated, or the particles are gelated, so the particle size distribution deteriorates in some cases.

On the other hand, when the amount of the alkaline catalyst supplied exceeds 0.4 mol, the generated core particles are stabilized too much. Accordingly, even if the core particles having an irregular shape are generated in the stage of core particle generation, the core particles grow into spherical particles in the stage of core particle growth, which makes it difficult to obtain silica particles having an irregular shape.

Herein, in the supplying step, though the tetraalkoxysilane and alkaline catalyst are supplied respectively into the alkaline catalyst solution, the supply method may be a method of continuous supply or a method of intermittent supply.

In the supplying step, the temperature of the alkaline catalyst solution (temperature at the time of supply) is, for example, preferably from 5° C. to 50° C. and more preferably from 15° C. to 40° C.

In addition, A/B is preferably from 1 mol/((mol/min)/L) to 5 mol/((mol/min)/L). If A/B is less than 1 mol/((mol/min)/L), the core generation stage is not divided into two stages, and the silica particles do not have two maximum values in number particle size distribution in some cases. On the other hand, if A/B exceeds 5 mol/((mol/min)/L), the dispersibility of the silica particles becomes unstable, so the silica slurry is gelated in some cases.

A/B is defined as a ratio of A (total amount of the tetraalkoxysilane supplied) to B (flow rate of the tetraalkoxysilane supplied, based on the total amount of the solution into which the tetraalkoxysilane and the alkaline catalyst have been supplied) in the alkaline catalyst solution in which the silica particles are generated. The value of A/B is an index showing the amount of monomers supplied dropwise based on the scale.

Through the steps described above, the silica particles are obtained. In this state, the silica particles are obtained in a state of a dispersion. The silica particles may be used as is as the silica particle dispersion, or used by being taken as silica particle powder by removing the solvent.

When the silica particles are used as the silica particle dispersion, if necessary, the dispersion may be diluted with water or alcohol or concentrated to adjust the solid content concentration of the silica particles. In addition, the silica particle dispersion may be used after the solvent is replaced with another water-soluble organic solvent such as alcohols, esters, or ketones.

On the other hand, when the silica particles are used as silica particle powder, the solvent needs to be removed from the silica particle dispersion. Examples of the method of removing the solvent include known methods such as 1) a method of removing the solvent by filtration, centrifugation, distillation, or the like and then drying the resultant with a vacuum drier, a shelf drier, or the like, and 2) a method of directly drying the slurry by using a fluid-bed drier, a spray drier, or the like. Though not particularly limited, the drying temperature is preferably 200° C. or lower. If the temperature is higher than 200° C., due to the condensation of silanol groups remaining on the surface of the silica particles, the primary particles easily bind to each other, or coarse particles are easily generated.

If necessary, it is preferable that the dried silica particles be pulverized and sieved to remove the coarse particles or aggregates. Though not particularly limited, the pulverizing method is implemented using a dry-type pulverizing instrument such as a jet mill, a vibration mill, a ball mill, or a pin mill. The sieving method is implemented using a known instrument such as a vibration sieve or a wind classifier.

The silica particles obtained by the method of preparing silica particles according to the present exemplary embodiment may be used after the surface of the silica particles undergoes hydrophobizing treatment by using a hydrophobizing agent.

Examples of the hydrophobizing agent include known organic silicon compounds having an alkyl group (for example, a methyl group, an ethyl group, a propyl group, or a butyl group), and specific examples thereof include silane compounds (for example, methyltrimethoxysilane, dimethyldimethoxysilane, trimethylchlorosilane, and trimethylmethoxysilane) and silazane compounds such as hexamethyldisilazane, tetramethyldisilazane, and the like. One kind of the hydrophobizing agent may be used, or plural kinds thereof may be used.

Among these hydrophobizing agents, organic silicon compounds having a trimethyl group, such as trimethylmethoxysilane and hexamethyldisilazane are preferable.

The amount of the hydrophobizing agent used is not particularly limited. However, in order to obtain effects of hydrophobizing, the amount is, for example, preferably from 1% by weight to 100% by weight and more preferably from 5% by weight to 80% by weight based on the silica particles.

As the method of obtaining a hydrophobic silica particle dispersion having under gone hydrophobizing treatment by the hydrophobizing agent, a method is exemplified in which the hydrophobizing agent is added in a necessary amount to the silica particle dispersion and reacted in a temperature range of from 30° C. to 80° C. under stirring to perform the hydrophobizing treatment on the silica particles, thereby obtaining the hydrophobic silica particle dispersion. If the reaction temperature is lower than 30° C., it is difficult to cause the hydrophobizing reaction. If the temperature exceeds 80° C., due to self-condensation of the hydrophobizing agent, the dispersion is easily gelated, or the silica particles are easily aggregated with each other.

Meanwhile, examples of the method of obtaining the hydrophobic silica particles as powder include a method of obtaining a hydrophobic silica particle dispersion by the above method and then drying the dispersion by the above method to obtain powder of hydrophobic silica particles, a method of obtaining powder of hydrophilic silica particles by drying the silica particle dispersion, and then performing the hydrophobizing treatment by adding the hydrophobizing agent to obtain powder of hydrophobic silica particles, a method of obtaining a hydrophobic silica particle dispersion, drying the dispersion to obtain powder of hydrophobic silica particles, and then performing hydrophobizing treatment by adding the hydrophobizing agent to obtain powder of hydrophobic silica particles, and the like.

Herein, as the method of performing the hydrophobizing treatment on the silica particles as powder, a method is exemplified in which the hydrophilic silica particles as powder are stirred in a treatment vessel such as a Henschel mixer or fluidized-bed, the hydrophobizing agent is added thereto, and the inside of the treatment vessel is heated to gasify the hydrophobizing agent such that the hydrophobizing agent is allowed to react with the silanol groups on the surface of the silica particles as powder. Though not particularly limited, the treatment temperature is, for example, preferably from 80° C. to 300° C. and more preferably from 120° C. to 200° C.

EXAMPLES

Hereinafter, the present invention will be described in more detail based on examples. Here, the respective examples do not limit the present invention. In addition, "part(s)" and "%" are based on weight unless otherwise specified.

In addition, the molecular weight of the respective components used below is methanol: 32.04, $NH_3$: 17.03, and tetramethoxysilane (TMOS): 152.22. Moreover, the specific gravity of methanol is 0.79 and the specific gravity of 10% aqueous ammonia is 1.00.

Example 1

—Step of Preparing Alkaline Catalyst Solution—

As an experimental instrument, a glass reaction container having a volume of 1 L provided with a metallic stirring rod, a dripping nozzle (a micro tube pump made of Teflon (registered trademark)), and a thermometer is prepared.

As an initial charge amount, 210.50 parts of methanol and 25.68 parts of 13.4% aqueous ammonia are put in the reaction container of the experimental instrument, followed by mixing under stirring, thereby obtaining an alkali catalyst solution (1). At this time, the concentration of the ammonia catalyst in the alkaline catalyst solution, that is, $NH_3$ (mol)/ [$NH_3$+methanol+water (L)] is 0.70 mol/L.

—Supplying Step (Generation of Silica Particles 1)—

The temperature of the alkaline catalyst solution (1) is adjusted to 25° C., and nitrogen purging is performed on the alkaline catalyst solution (1). Thereafter, while the alkaline catalyst solution (1) is being stirred, 92.16 parts of tetramethoxysilane (TMOS) and 21.75 parts of aqueous ammonia with a catalyst ($NH_3$) concentration of 9.70% by weight are started to be supplied dropwise thereto simultaneously at the following supply rate, thereby obtaining a suspension of silica particles (silica particle suspension (1)).

Herein, the supply rate of the tetramethoxysilane (TMOS) is set to 8.06 parts/min, based on the total mole number of methanol in the alkaline catalyst solution (1).

In addition, the supply rate of the 9.70% by weight aqueous ammonia is set to 1.90 parts/min, based on the total amount of the tetraalkoxysilane supplied per minute (8.06 parts/min). This rate corresponds to 0.205 mol/min based on 1 mol as the total amount of the tetraalkoxysilane supplied per minute.

Herein, the values of C/B at points in time when the amount of the TMOS supplied in the supplying step is A/8, A/4, A/2, 5A/8, 6A/8, 7A/8, and A are calculated. The value of C/B is calculated as follows. First, assuming that 100% of the tetraalkoxysilane has reacted, the value of a water concentration (C) in the reaction system is calculated from the amount of water charged and the amount of tetraalkoxysilane and the aqueous ammonia supplied dropwise. Thereafter, from the flow rate of the tetraalkoxysilane supplied (flow rate at each point in time) and the amount of the alkaline catalyst solution (the total amount of the solution into which TMOS and the alkaline catalyst have been supplied at each point in time), B is calculated. Subsequently, from the obtained C and B, C/B is calculated. The obtained values of C/B are shown in Table 2.

—Step of Hydrophobizing Treatment—

Subsequently, trimethylsilane is added to the obtained suspension, and the resultant is heated and dried on a hot plate at 100° C., thereby generating powder particles.

Example 2

Silica particles are prepared in the same manner as in Example 1, except that the concentration and amount of the initially charged aqueous ammonia are set to 18.1% and 27.15 parts respectively in the step of preparing silica particles.

Example 3

Silica particles are prepared in the same manner as in Example 1, except that the concentration and amount of the initially charged aqueous ammonia are set to 11.8% and 25.20 parts respectively in the step of preparing silica particles.

Example 4

Silica particles are prepared in the same manner as in Example 1, except that the amount of the aqueous ammonia supplied dropwise is set to 60.00 parts, and the flow rate of the aqueous ammonia supplied dropwise is set to 5.25 parts/min in the step of preparing silica particles.

Example 5

Silica particles are prepared in the same manner as in Example 1, except that the amount of aqueous ammonia supplied dropwise is set to 4.73 parts, and the flow rate of aqueous ammonia supplied dropwise is set to 0.41 part/min in the step of preparing silica particles.

Example 6

Silica particles are prepared in the same manner as in Example 1, except that the flow rate of the tetramethoxysilane supplied dropwise is set to 4.09 parts/min, and the flow rate of the aqueous ammonia supplied dropwise is set to 0.97 part/min in the step of preparing silica particles.

Example 7

Silica particles are prepared in the same manner as in Example 1, except that the flow rate of the tetramethoxysilane supplied dropwise is set to 12.68 parts/min, and the flow rate of the aqueous ammonia supplied dropwise is set to 2.99 parts/min in the step of preparing silica particles.

Example 8

Silica particles are prepared in the same manner as in Example 1, except that the flow rate of the tetramethoxysilane supplied dropwise is set to 7.00 parts/min, the amount of the aqueous ammonia supplied dropwise is set to 30.00 parts, and the flow rate of aqueous ammonia is set to 2.28 parts/min in the step of preparing silica particles.

Comparative Example 1

Silica particles are prepared in the same manner as in Example 1, except that the concentration and amount of the initially charged aqueous ammonia are set to 8.82% and 60.00 parts respectively in the step of preparing silica particles.

Comparative Example 2

Silica particles are prepared in the same manner as in Example 1, except that the concentration and amount of the initially charged aqueous ammonia are set to 17.5% and 14.55 parts respectively in the step of preparing silica particles.

Comparative Example 3

Silica particles are prepared in the same manner as in Example 1, except that the amount of the aqueous ammonia supplied dropwise is set to 96.25 parts, and the flow rate of the aqueous ammonia supplied dropwise is set to 8.42 parts/min in the step of preparing silica particles.

Comparative Example 4

Silica particles are prepared in the same manner as in Example 1, except that the amount of the aqueous ammonia supplied dropwise is set to 0.00 part, and the flow rate of the aqueous ammonia supplied dropwise is set to 0 part/min in the step of preparing silica particles.

Comparative Example 5

Silica particles are prepared in the same manner as in Example 1, except that the flow rate of the tetramethoxysilane supplied dropwise is set to 3.77 parts/min, and the flow rate of the aqueous ammonia supplied dropwise is set to 1.13 parts/min in the step of preparing silica particles.

Comparative Example 6

Silica particles are prepared in the same manner as in Example 1, except that the flow rate of the tetramethoxysilane supplied dropwise is set to 24.50 parts/min, and the flow rate of the aqueous ammonia supplied dropwise is set to 5.78 parts/min in the step of preparing silica particles.

Comparative Example 7

Silica particles are prepared in the same manner as in Example 1, except that the flow rate of the tetramethoxysilane supplied dropwise is set to 16.00 parts/min, and the flow rate of the aqueous ammonia supplied dropwise is set to 3.78 parts/min in the step of preparing silica particles.

Comparative Example 8

Silica particles are prepared in the same manner as in Example 1, except that the amount of the aqueous ammonia charged initially is set to 25.61 parts, the flow rate of the tetramethoxysilane supplied dropwise is set to 10.00 parts/min, the amount of the aqueous ammonia supplied dropwise is set to 4.00 parts, and the flow rate of the aqueous ammonia supplied dropwise is set to 0.43 part/min in the step of preparing silica particles.

The conditions in the method of preparing silica particles in each example are shown in Tables 1 and 2.

Evaluation

Physical Properties of Silica Particles

The particle size ratio (particles of small-size side/particles of large-size side), number ratio (particles of small-size side/particles of large-size side), and the average circularity and average shrinkage ratio within a range of 10% from the large-size side in number particle size distribution of the hydrophobized silica particles obtained in each example are calculated by the method described above.

Function of Silica Particles

—Preparation of Body of Resin Particles (Preparation of Amorphous Resin Particles A)—

23 mol % of dimethyl terephthalate, 10 mol % of isophthalic acid, 15 mol % of dodecenyl succinic anhydride, 3 mol % of trimellitic anhydride, 5 mol % of a bisphenol A ethylene oxide 2 mol adduct, and 45 mol % of a bisphenol A propylene oxide 2 mol adduct are put in a reaction container provided with a stirrer, a thermometer, a condenser, and a nitrogen gas-introducing tube, and the inside of the reaction container is purged with dry nitrogen gas. Thereafter, 0.06 mol % of dibutyltin oxide as a catalyst is added thereto, and the mixture is reacted under stirring for about 7 hours at about 190° C. under a nitrogen gas flow. The temperature is raised to about 250° C. to react the mixture under stirring for about 5.0 hours, and then the internal pressure of the reaction container is reduced to 10.0 mmHg to react the mixture under stirring for about 0.5 hour under reduced pressure, thereby obtaining a polyester resin having a polar group in the molecule.

Thereafter, 100 parts of the polyester resin is melted and kneaded by a Banbury mixer-type kneader. The kneaded material is molded into a plate shape having a thickness of 1 cm by using a rolling roll, roughly ground with a Fitz mill-type grinder to have a size of about several millimeters, and then finely pulverized by an IDS-type pulverizer. Subsequently, the resultant is sequentially classified by an elbow-type classifier, thereby obtaining amorphous resin particles having a volume average particle diameter of 7 μm.

—Attaching Step—

The hydrophobized silica particles obtained in the respective examples are added to 20 parts of the amorphous resin particles having a volume average particle diameter of 7 μm that are obtained in the above preparation method, such that the coverage ratio becomes 50%, and the particles are mixed for 30 seconds at 15000 rpm by a 0.4 L sample mill, thereby obtaining resin particles containing the hydrophobized silica particles. At this time, the specific gravity of the amorphous resin particles as the body of resin particles is 1.05, and the specific gravity of the hydrophobized silica particles as the silica particles obtained in the respective examples is 1.5.

The dispersibility of the silica particles obtained in the respective examples that is exhibited when the silica particles are dispersed in the resin particles, and the fluidity and mechanical strength (resistance to stress such as stirring) of the resin particles to which the silica particles are attached are evaluated in the following manner.

—Dispersibility Evaluation—

The surface of the prepared resin particles containing the hydrophobized silica particles is observed by using a SEM. In addition, by image analysis, an attachment area of the hydrophobized silica particles is measured. The coverage ratio of the hydrophobized silica particles is calculated from the ratio of a total attachment area D of specific silica particles to a surface area C of the body of resin particles [(D/C)×100] to conduct evaluation based on the following criteria.

A: Silica particles exhibit a coverage ratio of 45% or more and are attached onto the surface of the body of resin particles without showing uneven distribution, and almost no aggregates are observed.

B: Though aggregates of silica particles are observed to a slight extent, the silica particles exhibit a coverage ratio of 40% or more and less than 45% and are attached onto the surface of the body of resin particles without showing uneven distribution.

C: Aggregates of silica particles are found here and there, and the coverage ratio of silica particles on the surface of the body of resin particles is less than 40% which indicates dispersion defects.

—Fluidity Evaluation—

For the resin particles containing the hydrophobized silica particles, an apparent specific gravity in a loosened state and an apparent specific gravity in a packed state of the resin particles are measured using a powder tester manufactured by Hosokawa Micron Limited. From the ratio between the apparent specific gravity in a loosened state and the apparent specific gravity in a packed state, a compression ratio is calculated using the following formula, and from the calculated compression ratio, the fluidity of the resin particles is evaluated.

Compression ratio=[(apparent specific gravity in packed state)−(apparent specific gravity in loosened state)]/(apparent specific gravity in packed state)

The "apparent specific gravity in a loosened state" is a measurement value obtained by filling the resin particles in a sample cup having a volume of 100 cm$^3$ and weighing the particles, and refers to a packing specific gravity obtained in a state where the resin particles are allowed to fall into the sample cup by gravity. The "apparent specific gravity in a packed state" refers to an apparent specific gravity obtained by tapping the sample cup to remove air from the state of the apparent specific gravity in a loosened state, such that the resin particles are rearranged and more densely fill the cup.

In addition, in the fluidity evaluation, the particles are mixed for 60 minutes using a Turbula shaker before measurement to apply a mechanical load, just like the evaluation of dispersion maintainability.

The evaluation criteria are as follows.
AA: a compression ratio of less than 0.3
A: a compression ratio of 0.3 or more and less than 0.4
C: a compression ratio of 0.4 or more —Mechanical Strength Evaluation—

The resin particles containing the hydrophobized silica particles are mixed by being shaken for 10 minutes using a shaker, and then a sample is collected for SEM observation. The collected sample is named sample (1). After the sample (1) is further shaken for 30 minutes using a shaker, a sample is collected from the sample and named sample (2). For each of the obtained samples (1) and (2), the circle-equivalent diameter of 100 primary particles is measured by SEM observation and image analysis so as to compare the circle-equivalent diameters of the samples with each other, and evaluation is performed based on the following criteria.

A: There is no difference in the circle-equivalent diameter between the samples (1) and (2), and loss of silica particles is not caused.
B: The circle-equivalent diameter of the sample (2) decreases slightly, but this is unproblematic in practical use.
C: The circle-equivalent diameter of the sample (2) decreases markedly, and the strength is insufficient.

—Chargeability—

The chargeability of the obtained silica particles is evaluated as follows. 19.8 g of an iron powder carrier and 0.2 g of the resin particles containing the hydrophobized silica particles are accurately weighed and put into a sample bottle. While the cap is opened, the resultant is humidified for 3 hours or longer in each of a thermohygrostat (C) that has been adjusted in advance to 10° C. and 50% RH and a thermohygrostat (A) that has been adjusted in advance to 28° C. and 85% RH. After humidification, the bottle is capped, and the resultant is mixed by being shaken for 30 minutes using a shaker. 1.00 g of the mixed sample is taken by being weighed accurately, and the charge amount of the sample humidified in each of the thermohygrostats (C) and (A) is measured using a charge amount measuring instrument, a blow-off powder charge amount measuring instrument. The chargeability at the time when a charge amount of the thermohygrostat (C) is denoted as c, and a charge amount of the thermohygrostat (A) is denoted as a is evaluated based on the following criteria.
AA: c/a=1
A: 1>c/a≥0.8
B: 0.8>c/a≥0.5
C: 0.5>c/a Table 3 shows the characteristics of the silica particles and the evaluation results in a list.

In addition, in Comparative Examples 2, 4, and 6, the silica particles are gelated, so evaluation fails to be conducted.

TABLE 1

| | Alkaline catalyst solution (Step of preparing alkaline catalyst solution) | | | | Tetraalkoxysilane and alkaline catalyst supplied dropwise | | | | |
|---|---|---|---|---|---|---|---|---|---|
| | Weight of methanol (part) | Concentration of NH$_3$ (% by weight) | Weight of aqueous ammonia (part) | Concentration of NH$_3$ (mol/L) | Total amount of TMOS supplied (part) | Flow rate of TMOS (part/min) | Concentration of NH$_3$ (% by weight) | Total amount of aqueous ammonia supplied (part) | Flow rate of aqueous ammonia (part/min) |
| Example 1 | 210.50 | 13.4 | 25.68 | 0.70 | 92.16 | 8.06 | 9.70 | 21.75 | 1.90 |
| Example 2 | 210.50 | 18.1 | 27.15 | 0.99 | 92.16 | 8.06 | 9.70 | 21.75 | 1.90 |
| Example 3 | 210.50 | 11.8 | 25.20 | 0.60 | 92.16 | 8.06 | 9.70 | 21.75 | 1.90 |
| Example 4 | 210.50 | 13.4 | 25.68 | 0.70 | 92.16 | 8.06 | 9.70 | 60.00 | 5.25 |
| Example 5 | 210.50 | 13.4 | 25.68 | 0.70 | 92.16 | 8.06 | 9.70 | 4.73 | 0.41 |
| Example 6 | 210.50 | 13.4 | 25.68 | 0.70 | 92.16 | 4.09 | 9.70 | 21.75 | 0.97 |
| Example 7 | 210.50 | 13.4 | 25.68 | 0.70 | 92.16 | 12.68 | 9.70 | 21.75 | 2.99 |
| Example 8 | 210.50 | 13.4 | 25.68 | 0.70 | 92.16 | 7.00 | 9.70 | 30.00 | 2.28 |
| Comparative Example 1 | 210.50 | 8.82 | 60.00 | 1.06 | 92.16 | 8.06 | 9.70 | 21.75 | 1.90 |
| Comparative Example 2 | 210.50 | 17.5 | 14.55 | 0.54 | 92.16 | 8.06 | 9.70 | 21.75 | 1.90 |
| Comparative Example 3 | 210.50 | 13.4 | 25.68 | 0.70 | 92.16 | 8.06 | 9.70 | 96.25 | 8.42 |
| Comparative Example 4 | 210.50 | 13.4 | 25.68 | 0.70 | 92.16 | 8.06 | 0.00 | 0.00 | 0 |
| Comparative Example 5 | 210.50 | 13.4 | 25.68 | 0.70 | 92.16 | 3.77 | 9.70 | 21.75 | 1.13 |
| Comparative Example 6 | 210.50 | 13.4 | 25.68 | 0.70 | 92.16 | 24.50 | 9.70 | 21.75 | 5.78 |
| Comparative Example 7 | 210.50 | 13.4 | 25.68 | 0.70 | 92.16 | 16.00 | 9.70 | 21.75 | 3.78 |

TABLE 1-continued

| | Alkaline catalyst solution (Step of preparing alkaline catalyst solution) | | | | Tetraalkoxysilane and alkaline catalyst supplied dropwise | | | | |
|---|---|---|---|---|---|---|---|---|---|
| | Weight of methanol (part) | Concentration of NH$_3$ (% by weight) | Weight of aqueous ammonia (part) | Concentration of NH$_3$ (mol/L) | Total amount of TMOS supplied (part) | Flow rate of TMOS (part/min) | Concentration of NH$_3$ (% by weight) | Total amount of aqueous ammonia supplied (part) | Flow rate of aqueous ammonia (part/min) |
| Comparative Example 8 | 210.50 | 13.4 | 25.61 | 0.70 | 92.16 | 10.00 | 9.70 | 4.00 | 0.43 |

TABLE 2

| | C/B [(mol/L)/{(mol/min)/L}] | | | | | | |
|---|---|---|---|---|---|---|---|
| Supplied amount[1] | A/8 | A/4 | A/2 | 5A/8 | 6A/8 | 7A/8 | A |
| Example 1 | 32.7 | 30.5 | 26.7 | 25.1 | 23.7 | 22.3 | 21.1 |
| Example 2 | 32.7 | 30.5 | 26.7 | 25.1 | 23.6 | 22.3 | 21.1 |
| Example 3 | 32.8 | 30.5 | 26.7 | 25.1 | 23.7 | 22.3 | 21.1 |
| Example 4 | 38.3 | 40.9 | 45.0 | 46.7 | 48.2 | 49.5 | 50.7 |
| Example 5 | 30.2 | 25.6 | 17.6 | 14.2 | 11.0 | 8 | 5.3 |
| Example 6 | 64.5 | 60.2 | 52.7 | 49.5 | 46.6 | 44.0 | 41.6 |
| Example 7 | 20.8 | 19.4 | 17.0 | 16.0 | 15.0 | 14.2 | 13.4 |
| Example 8 | 40.0 | 43.9 | 50.2 | 52.7 | 54.9 | 56.9 | 58.6 |
| Comparative Example 1 | 87.3 | 82.9 | 75.0 | 71.6 | 68.5 | 65.6 | 62.9 |
| Comparative Example 2 | 17.8 | 16.3 | 13.9 | 12.9 | 12.0 | 11.1 | 10.3 |
| Comparative Example 3 | 43.3 | 49.9 | 61.0 | 64.0 | 67.4 | 70.4 | 73.1 |
| Comparative Example 4 | 29.4 | 24.1 | 14.9 | 10.8 | 7.1 | 3.6 | 0.4 |
| Comparative Example 5 | 75.8 | 72.9 | 68.1 | 66.1 | 64.2 | 62.5 | 61.0 |
| Comparative Example 6 | 10.8 | 10.0 | 8.8 | 8.3 | 7.8 | 7.3 | 6.9 |
| Comparative Example 7 | 16.5 | 15.4 | 13.5 | 12.7 | 11.9 | 11.2 | 10.6 |
| Comparative Example 8 | 24.2 | 20.4 | 13.8 | 10.9 | 8.3 | 5.9 | 3.6 |

[1] Amount of TMOS supplied at the time when the total amount of TMOS supplied dropwise is denoted as A

TABLE 3

| | Characteristics of silica particles | | | | | |
|---|---|---|---|---|---|---|
| | Number of maximum value[1] | Number average particle diameter (nm) | Maximum value of particles of large-size side (nm) | Maximum value of particles of small-size side (nm) | Average circularity[2] | Average shrinkage ratio[2] |
| Example 1 | 2 | 135 | 145 | 15 | 0.75 | 34 |
| Example 2 | 2 | 127 | 130 | 10 | 0.88 | 15 |
| Example 3 | 2 | 140 | 148 | 18 | 0.66 | 35 |
| Example 4 | 2 | 149 | 150 | 10 | 0.78 | 21 |
| Example 5 | 2 | 123 | 135 | 39 | 0.77 | 48 |
| Example 6 | 2 | 142 | 146 | 14 | 0.79 | 18 |
| Example 7 | 2 | 120 | 143 | 14 | 0.68 | 45 |
| Example 8 | 2 | 192 | 190 | 4 | 0.89 | 16 |
| Comparative Example 1 | 2 | 125 | 128 | 10 | 0.95 | 2 |
| Comparative Example 2 | —[4] | — | — | — | — | — |
| Comparative Example 3 | 1 | 151 | 151 | 0 | 0.87 | 1 |
| Comparative Example 4 | —[4] | — | — | — | — | — |
| Comparative Example 5 | 1 | 150 | 150 | 0 | 0.81 | 2 |
| Comparative Example 6 | —[4] | — | — | — | — | — |
| Comparative Example 7 | 2 | 130 | 135 | 42 | 0.85 | 46 |
| Comparative Example 8 | 2 | 132 | 136 | 13 | 0.84 | 45 |

TABLE 3-continued

|  | Characteristics of silica particles | | Characteristics at the time when silica particles are attached to resin particles | | | |
| --- | --- | --- | --- | --- | --- | --- |
|  | Particle size ratio[3] | Number ratio[3] | Dispersibility | Fluidity | Mechanical strength | Chargeability |
| Example 1 | 0.103 | 71 | A | AA | A | AA |
| Example 2 | 0.077 | 50 | A | AA | A | A |
| Example 3 | 0.120 | 68 | A | AA | A | AA |
| Example 4 | 0.067 | 18 | A | AA | A | A |
| Example 5 | 0.289 | 91 | A | AA | A | AA |
| Example 6 | 0.096 | 16 | A | AA | A | A |
| Example 7 | 0.098 | 98 | A | AA | A | AA |
| Example 8 | 0.021 | 13 | A | A | A | AA |
| Comparative Example 1 | 0.078 | 48 | C | A | B | B |
| Comparative Example 2 | — | — | — | — | — | — |
| Comparative Example 3 | 0 | 0 | B | C | A | B |
| Comparative Example 4 | — | — | — | — | — | — |
| Comparative Example 5 | 0 | 0 | A | C | A | B |
| Comparative Example 6 | — | — | — | — | — | — |
| Comparative Example 7 | 0.310 | 96 | B | C | C | A |
| Comparative Example 8 | 0.096 | 108 | C | B | C | B |

[1] Number of maximum value of number particle size distribution
[2] Particles within a range of 10% from large-size side of number particle size distribution
[3] Particles of small-size side/particles of large-size side
[4] Gelation From the above results, it is understood that the present examples yield excellent results in all of the respective evaluations of dispersibility, fluidity, mechanical strength, and chargeability.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of preparing silica particles, comprising:
preparing an alkaline catalyst solution in which an alcohol-containing solvent contains an alkaline catalyst at a concentration of from 0.6 mol/L to 1.0 mol/L; and
supplying tetraalkoxysilane and an alkaline catalyst into the alkaline catalyst solution, wherein
the silica particles that are prepared are a plurality of particles having two peaks in a number particle size distribution, the two peaks including a first peak and a second peak, wherein:
the first peak represents a small size particle diameter and the second peak represents a large size particle diameter, and
a particle size ratio (the small size particle diameter/ the large size particle diameter) is from 0.02 to 0.3; and
the supplying satisfies the following conditions,
within a range of from A/2 to A, there is a part where C/B is from 15(mol/L)/{(mol/min)L} to 60 (mol/L)/{(mol/min)L},
wherein, A represents the total amount of the tetraalkoxysilane supplied, B represents (a flow rate of the tetraalkoxysilane supplied)/(a total amount of a solution formed when the tetraalkoxysilane and an alkaline catalyst are supplied into the alkaline catalyst solution), and C represents a concentration of water in a reaction system.

2. The method of preparing silica particles according to claim 1,
wherein a concentration of the alkaline catalyst is in a range of from 0.63 mol/L to 0.78 mol/L.

3. The method of preparing silica particles according to claim 1, wherein C/B is from 20 (mol/L)/{(mol/min)L} to 50 (mol/L)/{(mol/min)L}.

4. The method of preparing silica particles according to claim 1, wherein C/B is from 25 (mol/L)/{(mol/min)L} to 40 (mol/L)/{(mol/min)L}.

5. The method of preparing silica particles according to claim 1, wherein the amount of the tetraalkoxysilane supplied is 0.002 mol/(mol·min) or more and less than 0.006 mol/(mol·min) based on the mole number of the alcohol in the alkaline catalyst solution.

6. The method of preparing silica particles according to claim 1,
wherein the tetraalkoxysilane is selected from tetramethoxysilane, tetraethoxysilane, tetrapropoxysilane, and tetrabutoxysilane.

7. The method of preparing silica particles according to claim 1,
wherein the alkaline catalyst is selected from ammonia, urea, monoamine, and a quaternary ammonium salt.

8. The method of preparing silica particles according to claim 1, wherein the silica particles have a number ratio (a number of particles with the small size particle diameter/a number of particles with the large size particle diameter) of from 1 to 100.

9. The method of preparing silica particles according to claim 1, wherein the particle size ratio is from 0.04 to 0.1.

10. The method of preparing silica particles according to claim 1, wherein the large size particle diameter is from 50 nm to 500 nm.

11. The method of preparing silica particles according to claim 1, wherein the large size particle diameter is from 100 nm to 300 nm.

12. The method of preparing silica particles according to claim 1, wherein the small size particle diameter is from 5 nm to 80 nm.

13. The method of preparing silica particles according to claim 1, wherein the small size particle diameter is from 10 nm to 50 nm.

14. The method of preparing silica particles according to claim 1, wherein the large size particle diameter is from 100 nm to 300 nm, and the small size particle diameter is from 5 nm to 80 nm.

15. The method of preparing silica particles according to claim 1, wherein a number average particle diameter of the silica particles is from 100 nm to 200 nm.

16. The method of preparing silica particles according to claim 1, wherein the silica particles within a range of 10% from the large size particle diameter have an average circularity of from 0.65 to 0.90 and an average shrinkage ratio of from 10 to 50.

* * * * *